US010021629B2

United States Patent
Lee et al.

(10) Patent No.: US 10,021,629 B2
(45) Date of Patent: Jul. 10, 2018

(54) METHOD FOR TRANSITING STATUS OF NETWORK NODE UPON REQUEST OF USER EQUIPMENT IN MULTI-RADIO ACCESS TECHNOLOGY ENVIRONMENT, AND APPARATUS THEREFOR

(71) Applicant: LG ELECTRONICS INC., Seoul (KR)

(72) Inventors: Eunjong Lee, Seoul (KR); Jaehoon Chung, Seoul (KR); Ilmu Byun, Seoul (KR); Hyeyoung Choi, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 14/904,360

(22) PCT Filed: May 12, 2014

(86) PCT No.: PCT/KR2014/004211
§ 371 (c)(1),
(2) Date: Jan. 11, 2016

(87) PCT Pub. No.: WO2015/020300
PCT Pub. Date: Feb. 12, 2015

(65) Prior Publication Data
US 2016/0157164 A1    Jun. 2, 2016

Related U.S. Application Data

(60) Provisional application No. 61/863,402, filed on Aug. 7, 2013.

(51) Int. Cl.
*H04W 48/16*   (2009.01)
*H04W 24/02*   (2009.01)
(Continued)

(52) U.S. Cl.
CPC ........... *H04W 48/16* (2013.01); *H04W 24/02* (2013.01); *H04W 72/04* (2013.01);
(Continued)

(58) Field of Classification Search
CPC ... H04W 48/16; H04W 72/04; H04W 76/046; H04W 76/048; H04W 24/02;
(Continued)

(56) References Cited

U.S. PATENT DOCUMENTS

2010/0056160 A1*  3/2010  Kim .................. H04W 36/0055
                                                          455/444
2010/0284316 A1   11/2010  Sampathkumar
(Continued)

FOREIGN PATENT DOCUMENTS

CN         1754345 A     3/2006
CN       102246561 A    11/2011
(Continued)

OTHER PUBLICATIONS

Kondo et al., "Energy-efficient WLAN with on-demand AP wake-up using IEEE 802.11 frame length modulation," Computer Communications, vol. 35, 2012 (Available online May 12, 2012), pp. 1725-1735.

*Primary Examiner* — Andrew Lai
*Assistant Examiner* — Harry H Kim
(74) *Attorney, Agent, or Firm* — Birch, Stewart, Kolasch & Birch, LLP

(57) ABSTRACT

A method for scanning for a base station (BS) of a second radio access technology (RAT) by a user equipment (UE) connected to a first RAT in a multi-RAT environment includes receiving information about one or more BSs of the second RAT adjacent to the UE, from an interworking entity (IWE) of the first RAT which manages interworking between the first RAT and the second RAT, and transmitting
(Continued)

an awake request message to a specific BS among the BSs of the second RAT in a listening interval of the specific BS to which the UE desires to access, if a status of the specific BS is an idle mode, wherein listening interval information is included in the received information about the BSs of the second RAT.

10 Claims, 12 Drawing Sheets

(51) Int. Cl.
| | |
|---|---|
| H04W 72/04 | (2009.01) |
| H04W 76/04 | (2009.01) |
| H04W 88/06 | (2009.01) |
| H04W 36/00 | (2009.01) |
| H04W 48/12 | (2009.01) |
| H04W 88/08 | (2009.01) |
| H04W 84/04 | (2009.01) |
| H04W 84/12 | (2009.01) |
| H04W 52/02 | (2009.01) |

(52) U.S. Cl.
CPC ....... *H04W 76/046* (2013.01); *H04W 76/048* (2013.01); *H04W 36/0066* (2013.01); *H04W 48/12* (2013.01); *H04W 52/0206* (2013.01); *H04W 84/042* (2013.01); *H04W 84/12* (2013.01); *H04W 88/06* (2013.01); *H04W 88/08* (2013.01); *Y02B 60/50* (2013.01)

(58) Field of Classification Search
CPC ........... H04W 52/0206; H04W 84/042; H04W 84/12; H04W 36/0066; H04W 48/12; H04W 88/08; H04W 88/06; Y02B 60/50
See application file for complete search history.

(56) References Cited

U.S. PATENT DOCUMENTS

| | | | |
|---|---|---|---|
| 2010/0291863 | A1 | 11/2010 | Hsu et al. |
| 2011/0244870 | A1 | 10/2011 | Lee |
| 2012/0250548 | A1 | 10/2012 | Swaminathan et al. |
| 2013/0090116 | A1* | 4/2013 | Lim ................. H04W 36/0083 455/434 |
| 2013/0165114 | A1 | 6/2013 | Lee et al. |
| 2013/0223409 | A1* | 8/2013 | Jung ................. H04W 36/0072 370/331 |
| 2013/0329621 | A1 | 12/2013 | Kondo et al. |

FOREIGN PATENT DOCUMENTS

| | | |
|---|---|---|
| EP | 2 523 507 A1 | 11/2012 |
| JP | WO2011/125849 A1 | 10/2011 |
| JP | 2013-527683 A | 6/2013 |
| WO | WO 2012/114969 A1 | 8/2012 |

* cited by examiner

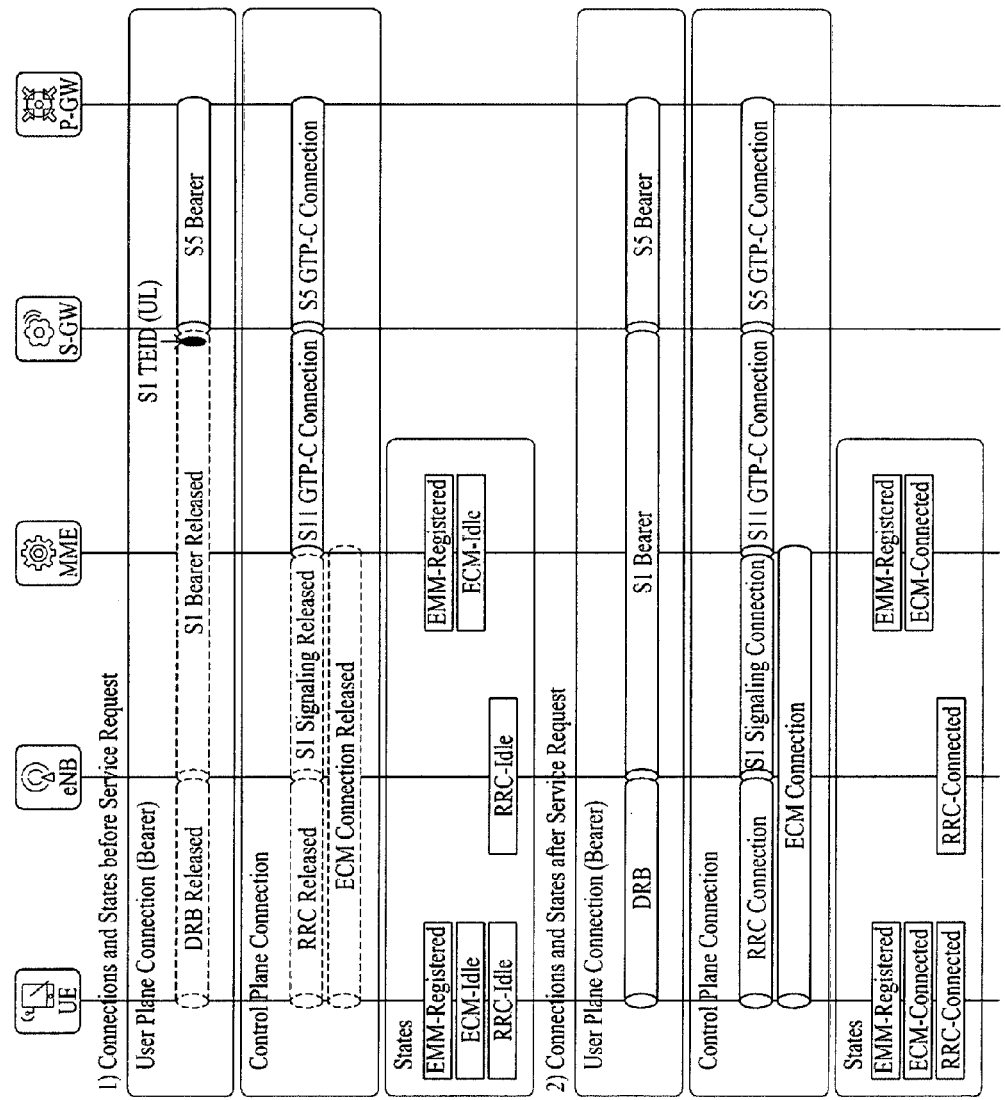

METHOD FOR TRANSITING STATUS OF NETWORK NODE UPON REQUEST OF USER EQUIPMENT IN MULTI-RADIO ACCESS TECHNOLOGY ENVIRONMENT, AND APPARATUS THEREFOR

CROSS REFERENCE TO RELATED APPLICATIONS

This application is the National Phase of PCT International Application No. PCT/KR2014/004211, filed on May 12, 2014, which claims priority under 35 U.S.C. 119(e) to U.S. Provisional Application No. 61/863,402, filed on Aug. 7, 2013, all of which are hereby expressly incorporated by reference into the present application.

TECHNICAL FIELD

The present invention relates to wireless communication, and more particularly, to a method for scanning for a node of a specific radio access technology (RAT) and transiting the status of the node in an environment where at least two RATs are converged, and an apparatus therefor.

BACKGROUND ART

Research is being conducted on multi-radio access technology (RAT) using convergence of heterogeneous communication networks. For example, a multi-RAT user equipment (UE) supports both a cellular network and a wireless local area network (WLAN). This multi-RAT UE can be selectively connected to only one of a plurality of RATs, but cannot be simultaneously connected to them. That is, even when a UE currently has multi-RAT capability, the UE cannot transmit/receive data simultaneously using different RATs.

In addition, according to a conventional multi-RAT technology, different RATs operate independently from each other and thus a whole system cannot operate integrally or systematically. For example, when a UE connected to a cellular network attempts to be switched to a WLAN, the UE should autonomously perform a series of operations related to scanning for and connection to the WLAN with no help of the cellular network and no preliminary information about the WLAN.

DISCLOSURE

Technical Problem

An object of the present invention devised to solve the problem lies on a method for scanning for a base station (BS) of a second radio access technology (RAT) in an idle mode by a user equipment (UE) connected to a first RAT in a multi-RAT environment, and transiting the BS of the second RAT to an active mode. Another object of the present invention devised to solve the problem lies on a UE for performing the above method.

Another object of the present invention devised to solve the problem lies on a method for transiting the status of a BS of a second RAT of which operation in an idle mode is defined by a first RAT, to an active mode upon a request of a UE in a multi-RAT environment. A further object of the present invention devised to solve the problem lies on a node for performing the above method.

It is to be understood that both the foregoing general description and the following detailed description of the present invention are exemplary and explanatory and are intended to provide further explanation of the invention as claimed.

Technical Solution

The object of the present invention can be achieved by providing a method for scanning for a base station (BS) of a second radio access technology (RAT) by a user equipment (UE) connected to a first RAT in a multi-RAT environment, the method including receiving information about one or more BSs of the second RAT adjacent to the UE, from an interworking entity (IWE) of the first RAT which manages interworking between the first RAT and the second RAT, and transmitting an awake request message to a specific BS among the BSs of the second RAT in a listening interval of the specific BS to which the UE desires to access, if a status of the specific BS is an idle mode, wherein listening interval information is included in the received information about the BSs of the second RAT.

In another aspect of the present invention, provided herein is a method for transiting a status of a base station (BS) of a second radio access technology (RAT) in an environment supporting interworking between multiple RATs, the method including transiting the status from an active mode to an idle mode if a predetermined trigger condition is satisfied, receiving information for defining operation of the BS of the second RAT in the idle mode, from an entity of a first RAT supporting interworking between the multiple RATs, discontinuously monitoring a channel in the idle mode based on listening interval information which is included in the received information for defining operation of the BS of the second RAT in the idle mode, and transiting the status of the BS of the second RAT to the active mode if an awake request message for requesting the BS of the second RAT to awake is received in a listening interval from a user equipment (UE) connected to the first RAT as a result of the discontinuous monitoring.

In another aspect of the present invention, provided herein is a user equipment (UE) connected to a first radio access technology (RAT) in a multi-RAT environment, the UE including a receiver for receiving information about one or more base stations (BSs) of a second RAT adjacent to the UE, from an interworking entity (IWE) of the first RAT which manages interworking between the first RAT and the second RAT, a transmitter for transmitting an awake request message to a specific BS among the BSs of the second RAT, if a status of the specific BS to which the UE desires to access is an idle mode, and a processor for controlling the transmitter to transmit the awake request message in a listening interval of the specific BS based on listening interval information included in the information about the BSs of the second RAT.

In a further aspect of the present invention, provided herein is a base station (BS) of a second radio access technology (RAT) in an environment supporting interworking between multiple RATs, the BS including a processor for transiting a status from an active mode to an idle mode if a predetermined trigger condition is satisfied, and a receiver for receiving information for defining operation of the BS of the second RAT in the idle mode, from an entity of a first RAT supporting interworking between the multiple RATs, wherein the processor controls the receiver to discontinuously monitor a channel in the idle mode based on listening interval information which is included in the received information for defining operation of the BS of the second RAT in the idle mode, and transits the status of the BS of the second RAT to the active mode if an awake request message for requesting the BS of the second RAT to awake is received in a listening interval from a user equipment (UE) connected to the first RAT as a result of the discontinuous monitoring.

Advantageous Effects

According to an embodiment of the present invention, since information about base stations (BSs) of a second radio access technology (RAT) is managed by an entity of a first RAT to which a user equipment (UE) is connected, the UE may scan for a BS of the second RAT in an idle mode, which is not easily scanned autonomously by the UE, using the information about the BS of the second RAT which is received from the entity of the first RAT, and thus the BS of the second RAT which is desired by the UE to access may be transited to an active mode. In addition, operating of and switching between the idle and active modes of the BS of the second RAT may be efficiently performed according to whether the UE is located in the coverage of the BS of the second RAT.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIGS. 1A to 1E illustrate a connection procedure between a user equipment (UE) and a cellular network;

BEST MODE

Figure 1B:
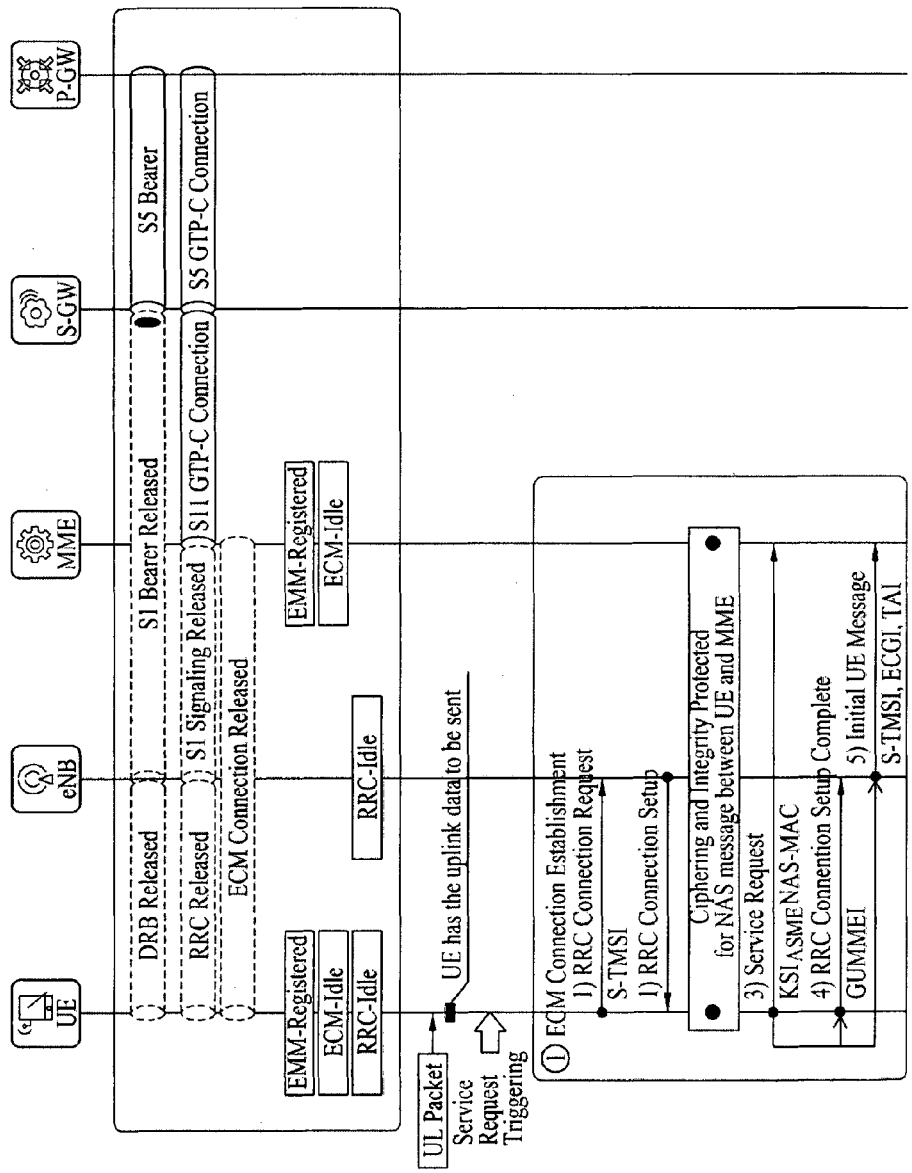

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the following detailed description, a first radio access technology (RAT) is a cellular system or a cellular network, and a 3rd Generation Partnership Project (3GPP) Long Term Evolution (LTE) or LTE-Advanced (LTE-A) system is exemplarily described in detail: However, except for unique features of 3GPP LTE or LTE-A, the first RAT may be implemented as another arbitrary cellular system. A second RAT is a wireless communication system or a wireless communication network using a wireless communication mode different from that of the first RAT, has smaller coverage compared to the first RAT, and may be a system for data transmission. For example, the second RAT may be a wireless local area network (WLAN) or a WLAN System such as Wireless Fidelity (WiFi), but is not limited thereto.

In the following description, a device collectively refers to a mobile or fixed user device such as a user equipment (UE), a mobile station (MS), an advanced mobile station (AMS), or a station (STA). In addition, a base station (BS) collectively refers to an arbitrary node in a first RAT or a second RAT, which communicates with a device, such as a Node B, an evolved Node B (eNode B or eNB), or an access point (AP). The present invention is described below based on the IEEE 802.16 system, but is also applicable to various other communication systems. In the following description, a BS of a second RAT collectively refers to an arbitrary node in the second RAT, which communicates with a device, such as an AP.

In a first RAT, a UE receives information from a BS in downlink (DL) and transmits information to the BS in uplink (UL). The information transmitted and received by the UE includes data and various types of control information, and various physical channels are present depending on the type and use of the information transmitted and received by the UE.

Techniques as set forth below are applicable to various multiple access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, or Evolved-UTRA (E-UTRA). UTRA is a part of Universal Mobile Telecommunication System (UMTS). 3rd Generation Partnership Project (3GPP) Long Term Evolution (LTE) is a part of Evolved-UMTS (E-UMTS) using E-UTRA and employs OFDMA for Downlink (DL) and SC-FDMA for Uplink (UL). LTE-Advanced (LTE-A) is an evolution of 3GPP LTE.

Specific terms used in the following description are provided for better understanding of the present invention. These specific terms may be replaced with other terms within the technical features of the present invention.

FIGS. 1A to 1E illustrate a connection procedure between a UE and a cellular network. A description is now given of service request between the UE and the cellular network with reference to FIGS. 1A to 1E.

Referring to FIG. 1A, the UE before service request is in EPS Mobility Management (EMM)-registered and EPS Connection Management (ECM)/Radio Resource Control (RRC)-idle state. In this state, the UE is registered in the cellular network but S1 connection is released due to traffic inactivation and radio resources are not assigned. That is, the UE is in the EMM-registered but ECM-idle state. For UE-triggered new traffic or network-triggered new traffic, the UE requests service to the cellular network.

In this state, a S5 GTP-C tunnel and a S11 GTP-C tunnel are maintained and ECM connection is released on the control plane, and a S5 bearer and a UL S1 bearer are maintained and a DL S1 bearer and a Date Radio Bearer (DRB) are released on the user plane.

If service request is succeeded, the UE is transited to ECM-connected state, ECM connection (RRC connection+ S1 signaling connection) is established on the control plane and an E-UTRAN Radio Access Bearer (E-RAB, e.g., DRB and S1 bearer) is established on the user plane, and thus traffic is transmittable and receivable. When the cellular network transmits traffic to the UE, the cellular network may notify the UE that there is traffic to be transmitted, and thus the UE may request service.

A description is now given of UE-triggered service request with reference to FIG. 1B. The UE is transmits a service request message to a mobility management entity (MME) to establish ECM connection. The service request message is transmitted to the MME by establishing RRC connection in a wireless period and establishing S1 signaling connection in an eNB-MME period. The service request message is transmitted to the eNB using an RRC connection Setup Complete message on a wireless link between the UE and the eNB. The service request message is transmitted to the MME between the eNB and the MME using an initial UE message which is a S1AP message.

Figure 1C:
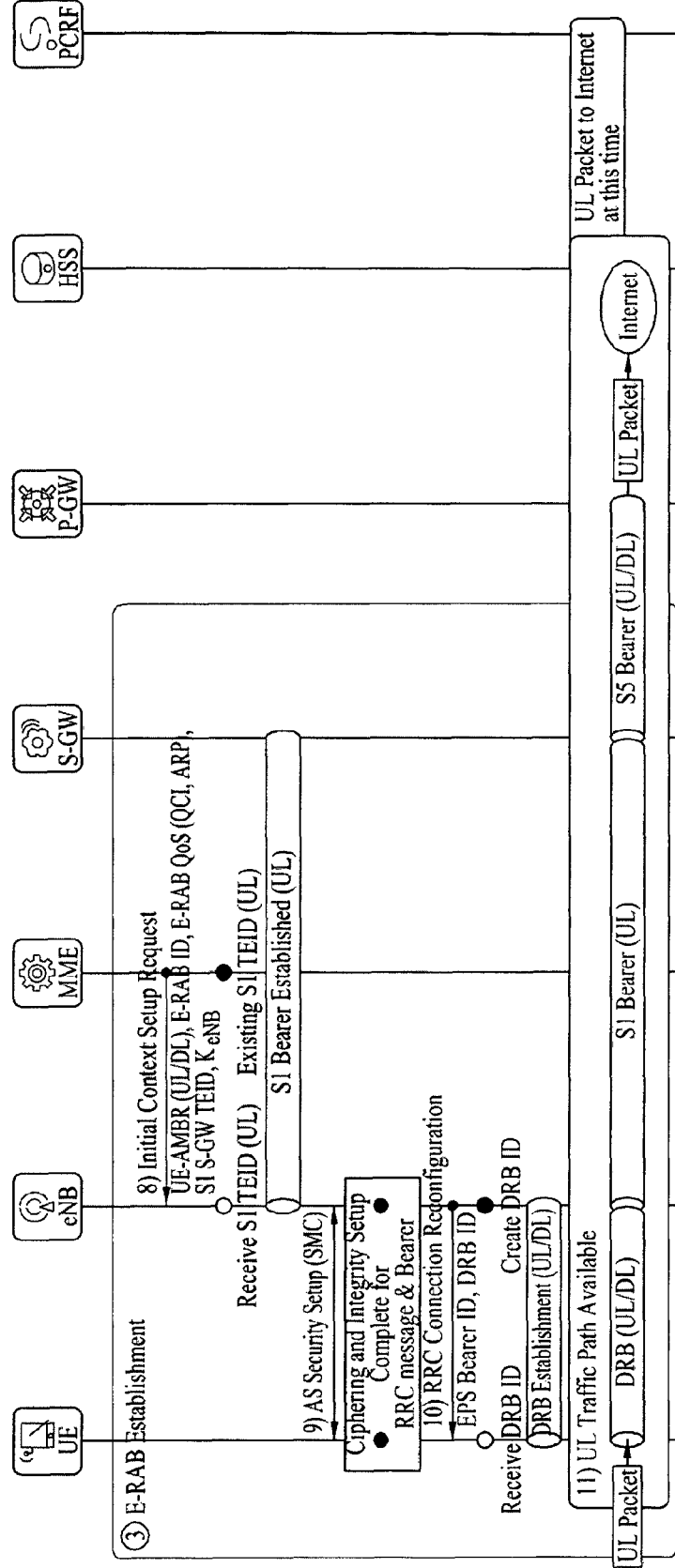

A description is now given of 10) DRB establishment from the eNB to the UE with reference to FIG. 1C. The eNB allocates a DRB identifier (ID) to create a DRB which is an Evolved Packet System (EPS) bearer of the wireless period. The eNB configures a DRB Quality of Service (QoS) parameter according to E-RAB QoS received from the MME, and transmits an RRC connection reconfiguration message to the UE. The UE receives the RRC connection reconfiguration message from the eNB and creates a DRB and a Signaling Radio Bearer (SRB)2. When the DRB is established, a UL EPS bearer is established from the UE to a Packet data network GateWay (P-GW) and thus UL traffic triggered by the UE is transmittable (11) UL Traffic Path Available).

Figure 1D:
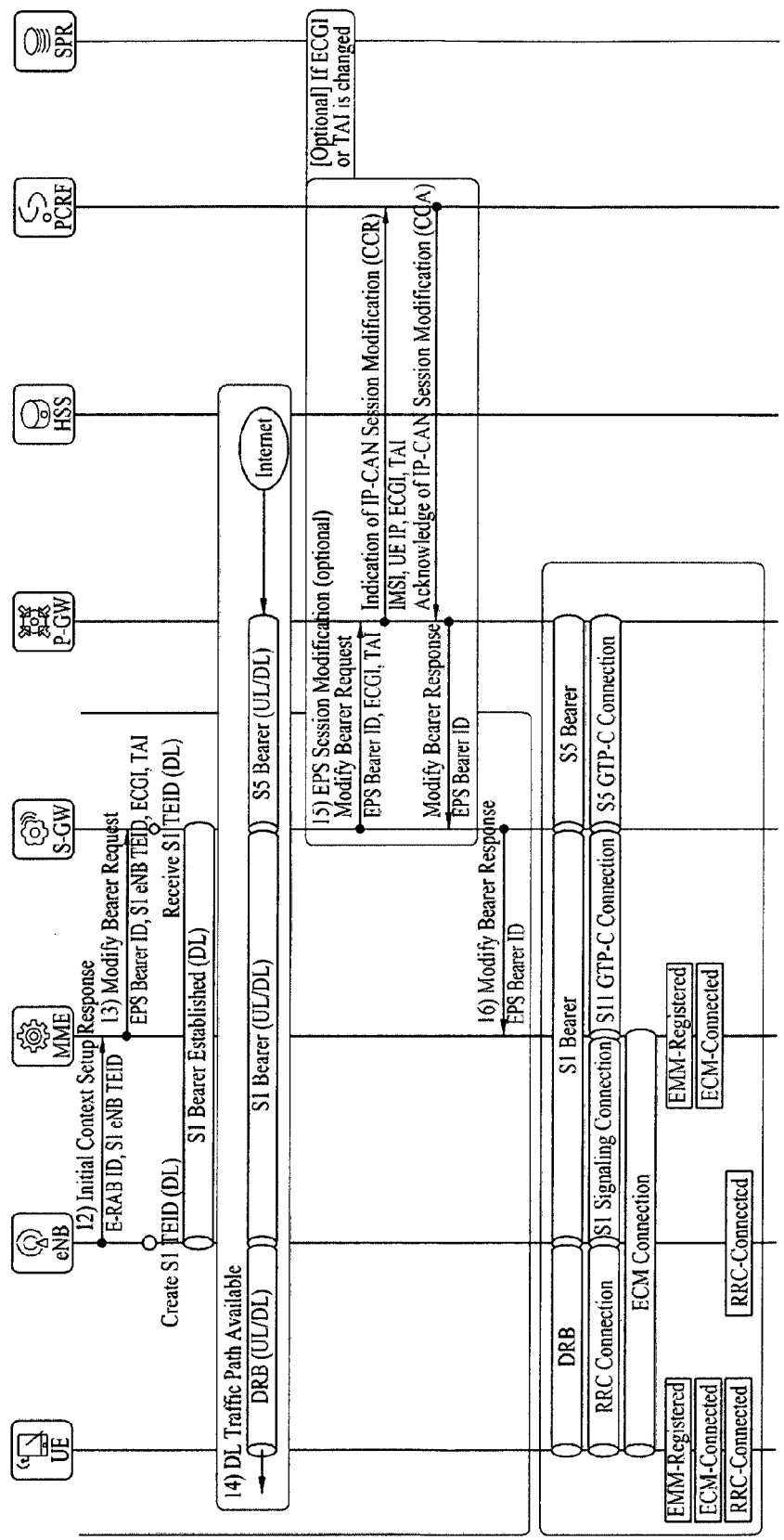

A description is now given of DL S1 bearer establishment from the eNB to a Serving GateWay (S-GW) with reference to FIG. 1D. In 12), the eNB allocates a DL S1 Tunnel Endpoint Identifier (TEID) for a S1 bearer (S1 eNB TEID). The eNB transmits the S1 eNB TEID to the MME using an initial context setup response message which is a response to an initial context setup request message received in 8). In 13), the MME transmits the S1 eNB TEID to the S-GW using a modify bearer request message. The S-GW receives the S1 eNB TEID and establishes a DL S1 bearer. The S-GW notifies the MME that DL S1 bearer establishment is completed, using a modify bearer response message in 16). After 13), a DL S1 GTP-U tunnel is created from the S-GW to the eNB, a DL EPS bearer is established from the P-GW to the UE, and thus DL traffic directed to the UE is transmittable (14) DL Traffic Path Available).

Figure 1E:
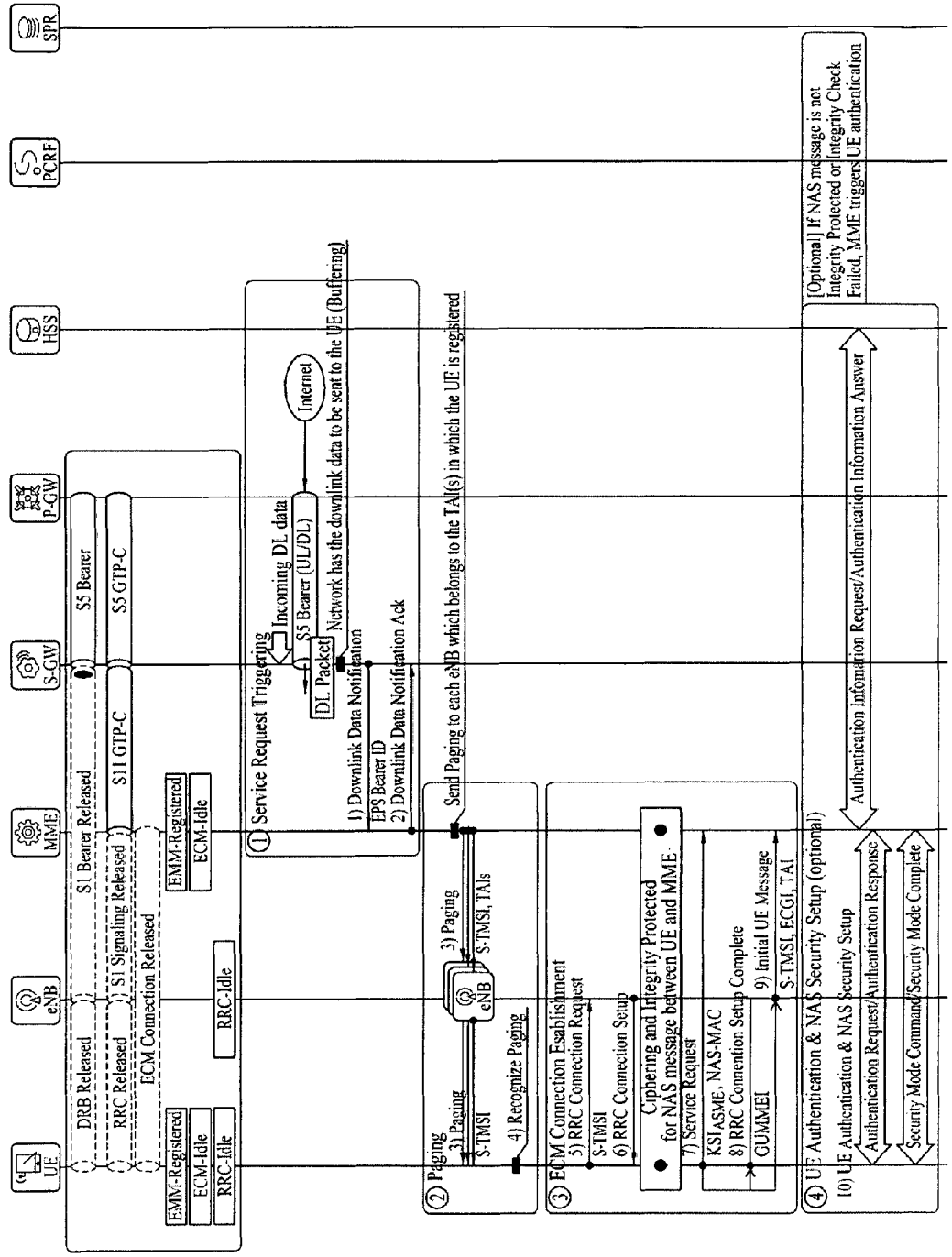

A description is now given of network-triggered service request with reference to FIG. 1E. FIG. 1E illustrates a network-triggered service request procedure in a case when DL traffic directed to the UE in idle state is triggered by the cellular network. Since the UE is in idle state, the MME does not know of a cell where the UE is currently located. The MME notifies the UE that there is traffic to be sent, through a paging procedure and establishes a bearer resource (E-RAB resource) which was released.

1. Service Request Triggering

The S-GW receives a DL data packet from the P-GW using a S5 bearer, but a DL S1 bearer is released. That is, when the S-GW does not have the S1 eNB TEID value and thus the DL data packet is not transmittable to the eNB, the S-GW buffers the received data packet and checks a MME in which a corresponding UE is registered. The S-GW transmits a downlink data notification message to the MME in which the UE is registered, to notify that signaling connection and bearer establishment are required for the UE.

2. Paging

Although the UE is located in a tracking area (TA) managed by the MME, the MME does not know of a cell where the UE is located. Accordingly, the MME sends a paging message to each eNB which belongs to a TA in which the UE is most recently registered. The eNB receives the paging message from the MME and broadcasts the paging message using a paging channel (PCH). The UE monitors the PCH and recognizes paging if the paging is to find the UE.

3. ECM Connection Establishment

The UE recognizes that there is traffic to be received and transmits a service request message to the MME to establish ECM connection. The ECM connection establishment procedure is started when the UE accesses a cell using a random access channel and transmits a RRC connection request message to establish RRC connection. After that, the ECM connection establishment procedure is performed in the same manner as the UE-triggered service request.

Figure 2:
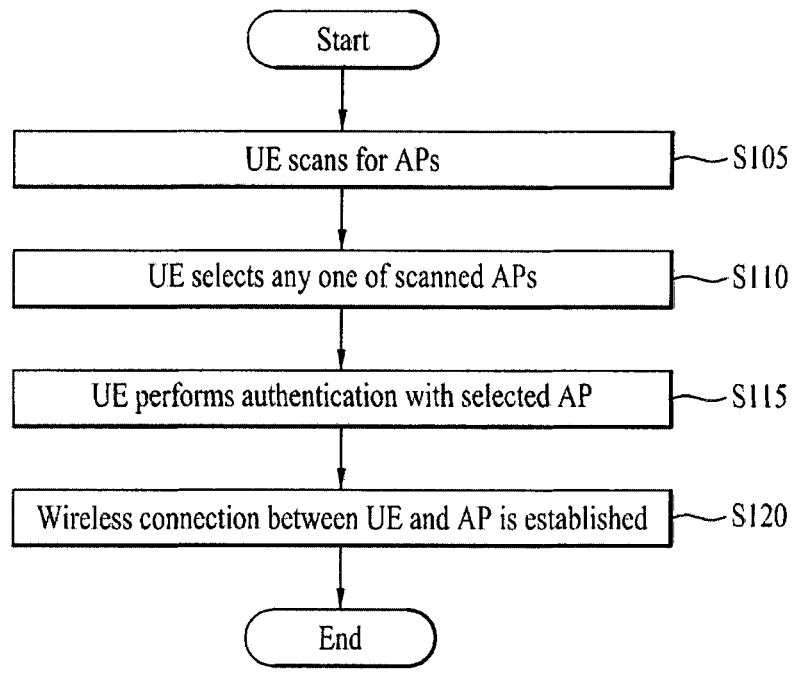
FIG. 2 illustrates a wireless local area network (WLAN) connection procedure according to IEEE 802.11.

FIG. 2 illustrates a wireless local area network (WLAN) connection procedure according to IEEE 802.11.

Referring to FIG. 2, a UE scans for neighboring APs of the WLAN (S105). The scanning scheme may be classified into two major schemes, active scanning and passive scanning. According to passive scanning, an AP periodically transmits a beacon frame. A UE receives the beacon frame and transmits a response message to the beacon frame, to the AP, and thus the AP is scanned. According to active scanning, an AP does not transmit a beacon frame and monitors a channel. If a UE transmits a probe request within the coverage of the AP, the AP transmits a probe response to the UE, and thus the AP is scanned.

The UE selects any one of the scanned APs (S110). The UE performs synchronization with the selected AP and acquires information about the selected AP. The UE performs authentication with the selected AP (S115). The authentication scheme includes open system authentication by which an AP performs an authentication procedure in response to an authentication request of a UE, and shared key authentication by which a UE is authenticated using a shard key set in an AR The UE and the AP transmit and receive an authentication frame for authentication. After that, wireless connection between the UE and the AP is established (S220). The UE transmits an association request to the AP, and the AP allocates an association ID to the UE using an association response.

According to a conventional scheme, to scan for an AP, the AP should periodically transmit a beacon frame (passive scanning) or continuously monitor a probe request from a UE (active scanning). Thus, if the AP is turned off or in an idle mode, since the AP is incapable of transmitting a beacon frame or receiving a probe request, the UE may not scan for the AP.

Meanwhile, IEEE 802.11 defines a doze mode as a power saving mode of a UE. The doze mode has a function of stopping operation of a transceiver for a predetermined period of time if the UE does not transmit data or there is no data to be transmitted to the UE, to save power of the UE. In a scheme for transiting from an awake mode to the doze mode, the UE is transited to the dose mode by defining a listing interval in an initial association request frame. Alternatively, the UE may enter the dose mode as necessary after transmitting a null data frame set as PM=1 and receiving acknowledgement (ACK) thereof. In the dose mode, the UE awakes temporarily near a time when the beacon frame is transmitted, and checks the beacon frame. The UE checks a Traffic Indication MAP (TIM) Information Element (IE). In a scheme for transiting from the dose mode to the awake mode, when a bit corresponding to an association ID (AID) of the UE is set to 1 in a TIM, the UE awakes and transmits a power save (PS)-poll message by inserting its AID to a duration area of the message. An AP receives the PS-poll frame and transmits buffered data to the UE. If two or more buffered frames are present, the AP notifies the UE that there are more frames, by setting a more data bit to 1.

Before a description is given of a multi-RAT environment according to the present invention, a brief description is now given of an inter RAT technology in a conventional multi-RAT environment. The conventional inter RAT technology is designed based on a request of a UE and does not require interworking between a WLAN and a cellular network. A specific network server manages WLAN information, and inter RAT handover is performed upon a request of a UE. Furthermore, even when the UE is simultaneously accessible to multiple RATs, the UE access multiple RATs in a manner to support only flow mobility/IP-flow mapping at a network level without control at a radio level.

The conventional scheme for supporting multiple RATs by the UE includes IP Flow Mobility (IFOM) and Multi Access PDN Connectivity (MAPCON). IFOM is a WLAN offloading technology based on Dual Stack Mobile IPv6 (DSMIPv6) on an IP Flow basis in 3G/WiFi Seamless Offload (Rel-10) of 3GPP. DSMIPv6 is a solution for simultaneously supporting IPv4 and IPv6 by a UE and a network. Since mobile communication networks are diversified to make IPv6 widespread and mobility support becomes a main issue to make even a conventional IPv4 network support mobility, DSMIPv6 has been adopted. IFOM is a client-based Mobile Internet Protocol (MIP) technology for detecting and reporting movement of a UE to an agent, by the UE. An agent for managing mobility of a mobile node includes a home agent (HA) which uses a flow binding table and a binding cache table. IFOM uses DSMIPv6 only for a technical reason that management on an IP flow basis is not easy if Proxy Mobile IPv6 (PMIPv6) is used.

MAPCON is a technology for simultaneous multiple Public Data Network (PDN) connectivity to different Access Point Names (APNs). MAPCON is protocol-independent, and all of PMIPv6, GTP, and DSMIPv6 are usable. According to MAPCON, all data flows through one PDN move.

The above-described conventional technology requires no control connection between an AP and a cellular network, and has been processed based on a request of a UE. However, to increase the efficiency of a whole network using multiple RATs, network-based tightly-coupled management is required rather than relying on the UE-request-based technology.

In embodiments of the present invention, direct control connection is established between different RATs and thus efficient and inter-RAT interworking is enabled.

Figure 3A:
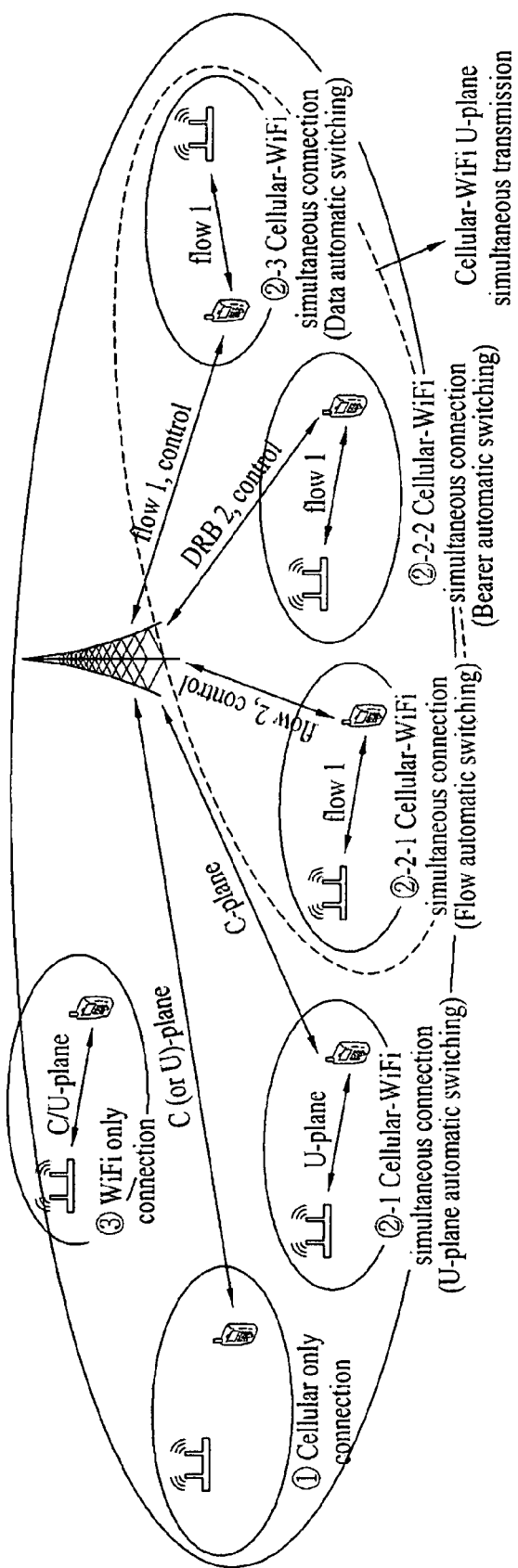
FIGS. 3A and 3B illustrate multi-radio access technology (RAT) environments according to embodiments of the present invention.

FIG. 3A illustrates a multi-RAT environment according to an embodiment of the present invention.

When a UE is connected to a cellular network only as in ①, for WiFi automatic switching/simultaneous transmission, previous technology definition is required. AP information management for interworking is performed at a network level (cellular-WiFi), and WiFi discovery and WiFi network connection are performed at a device level (cellular—device—WiFi).

②-1, ②-2-1, ②-2-2, and ②-3 respectively show WiFi automatic switching for the user plane, WiFi automatic switching for a flow, WiFi automatic switching for a bearer, and WiFi automatic switching for data. A procedure for requesting an AP in an idle mode to transit its status by a UE which desires to access the AP needs to be defined.

According to ②-1, if cellular-WiFi U-plane automatic switching is performed, every data is transmitted using WiFi only. According to ②-2 and ②-3 scenarios, if the cellular-WiFi U-plane is switched to allow simultaneous transmission, data may be simultaneously transmitted using WiFi and a cellular network through bandwidth segregation or aggregation. Here, bandwidth segregation refers to automatic switching per flow (service/IP flow) as in ②-2, and different flows are transmitted through different RATs. In ②-2, automatic switching per flow may include automatic switching per one or more service/IP flow(s), i.e., switching on a flow basis (②-2-1) or switching per data radio (or EPS) bearer (②-2-2). Bandwidth aggregation allows the same flow to be transmitted through different RATs on a data basis as in ②-3.

After WiFi automatic switching is performed as in ②, cellular link control based on WiFi is enabled as in ③. A paging signal related to a cellular link or a control signal related to radio link failure is receivable using a WiFi link.

Figure 3B:
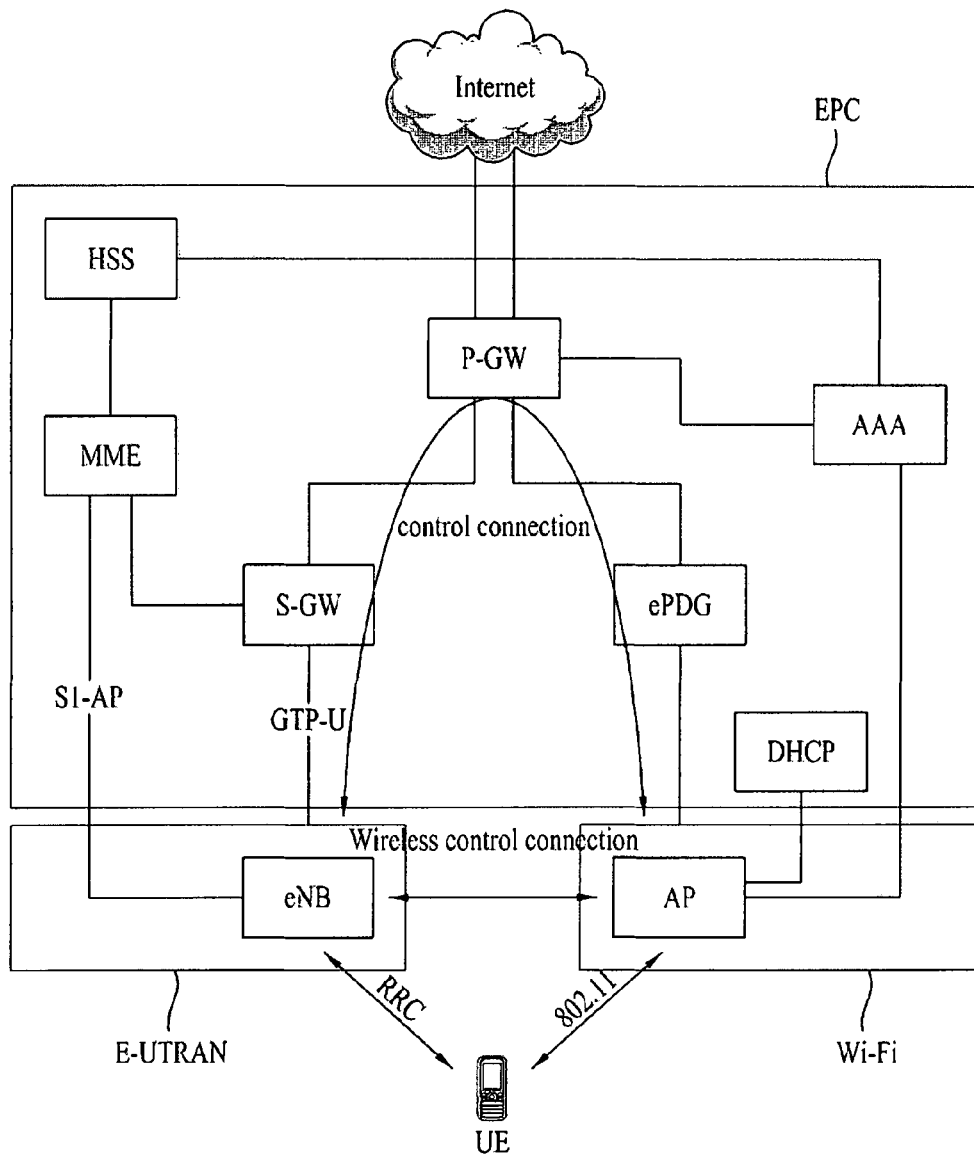

FIG. 3B illustrates a multi-RAT environment according to another embodiment of the present invention. Two different RATs are converged in the multi-RAT environment of FIG. 3B. Here, it is assumed that a first RAT is a cellular system (e.g., LTE/LTE-A or wireless broadband (WiBro) system) and a second RAT is a WiFi system, but the first RAT and the second RAT are not limited thereto. In the multi-RAT environment of FIG. 3B, control connection for interworking is present between the first RAT and the second RAT. The control connection may be, for example, wireless control connection between an eNB of the first RAT and an AP of the second RAT, or wired control connection through a backbone network such as Public data network Gateway (P-GW) or Evolved Packet Core (EPC).

To increase the energy efficiency of a whole system, an entity which is responsible for interworking between multiple RATs (hereinafter referred to as an interworking entity (IWE)) may indicate to turn off transmit (Tx)/receive (Rx) power of a specific RAT or control transition of the status of a node (e.g., AP) of the specific RAT, under a specific condition. Furthermore, in an AP jamming environment, interference mitigation between APs may also be controlled by the IWE.

The IWE which is responsible for interworking may be an arbitrary node in the first RAT, e.g., a cellular network. It is assumed that the following three entities have an interworking function. Accordingly, the IWE may be any one of (1), (2), and (3) below, but is not limited thereto.

(1) e-NB—Reuse existing entity
(2) Mobility Management Entity (MME)—Reuse existing entity
(3) InterWorking Management Entity (IWME)—Define new entity Before a UE simultaneously accesses multiple RATs, the IWE may assist the UE to select an optimal RAT or AP. To this end, the IWE may previously acquire information about the second RAT such as WiFi, from the UE or an AP.

According to an embodiment of the present invention, information about the second RAT and an AP of the second RAT is received from the first RAT before the UE access the second RAT. The present invention proposes a method for transiting the status of the AP of the second RAT to an active mode upon a request of the UE if the status of the AP of the second RAT scanned by the UE is an idle mode.

For peak throughput and data traffic off-loading, the UE may simultaneously support the first RAT and the second RAT through multi-RAT interworking. Here, the first RAT may be referred to as a primary network or a primary system, and the second RAT may be referred to as a secondary network or a secondary system. For example, the UE may be configured to simultaneously support LTE/LTE-A and WiFi (e.g., short-range communication system such as WLAN/ 802.11). This UE may be referred to as a multi-system capable UE in this specification.

In the network structure of FIG. 3B, the primary system may be a network having a wider coverage and for transmitting control information. An example of the primary system is a WiMAX or LTE (LTE-A) system. Meanwhile, the secondary system is a network having a narrower coverage and may be a system for transmitting data. The secondary network may be, for example, a WLAN or a WLAN system such as WiFi.

The followings are assumed in embodiments of the present invention.

An interworking function is related to an interworking-related procedure between eNB-UE or between eNB-AP, and an IWE stores/manages AP information. The IWE stores/manages information about APs under its coverage. The AP of the secondary system (e.g., WiFi) and the IWE of the primary system (e.g., LTE or WiMAX) can share necessary information through control connection therebetween. For information sharing between the AP and the IWE, Methods 1) to 4) below may be used.

Method 1). Wired Control Connection
A new interface is established through a backbone network.

Method 2). Wireless Control Connection
According to Method 2), an AP has an air interface with an eNB, and this AP may be referred to as eAP. For example, the eAP supports a LTE protocol stack for communication with the eNB as well as 802.11 MAC/PHY. The eAP may be regarded as a sort of LTE UE in relation with the eNB, and communicate with the eNB.

Method 3). AP and IWE Acquire Information about Each Other Using an Existing Server Outside a Network, for Example, Access Network Discovery Service Function (ANDSF)

Meanwhile, in embodiments of the present invention, the AP may transit its status to a turn on/off mode (or active/idle (sleep) mode) for the efficiency of a whole system. Information, e.g., status information, about APs may be stored and managed by the IWE. A method for storing and managing the information about APs by the IWE includes methods A to D below according to an entity of the first RAT which functions as the IWE, but is not limited thereto.

Method A). Use Air Interface Between eNB and AP
An eNB controls an AP similarly to a general UE, using wireless control connection with the AP.

Method B). Use Backhaul Interface Between eNB and AP
An eNB controls an AP using wired control connection with the AP.

Method C). Use Control Interface Between MME and AP
An AP (i.e., secondary system) is controlled using control connection between an MME and the AP.

Figure 4:
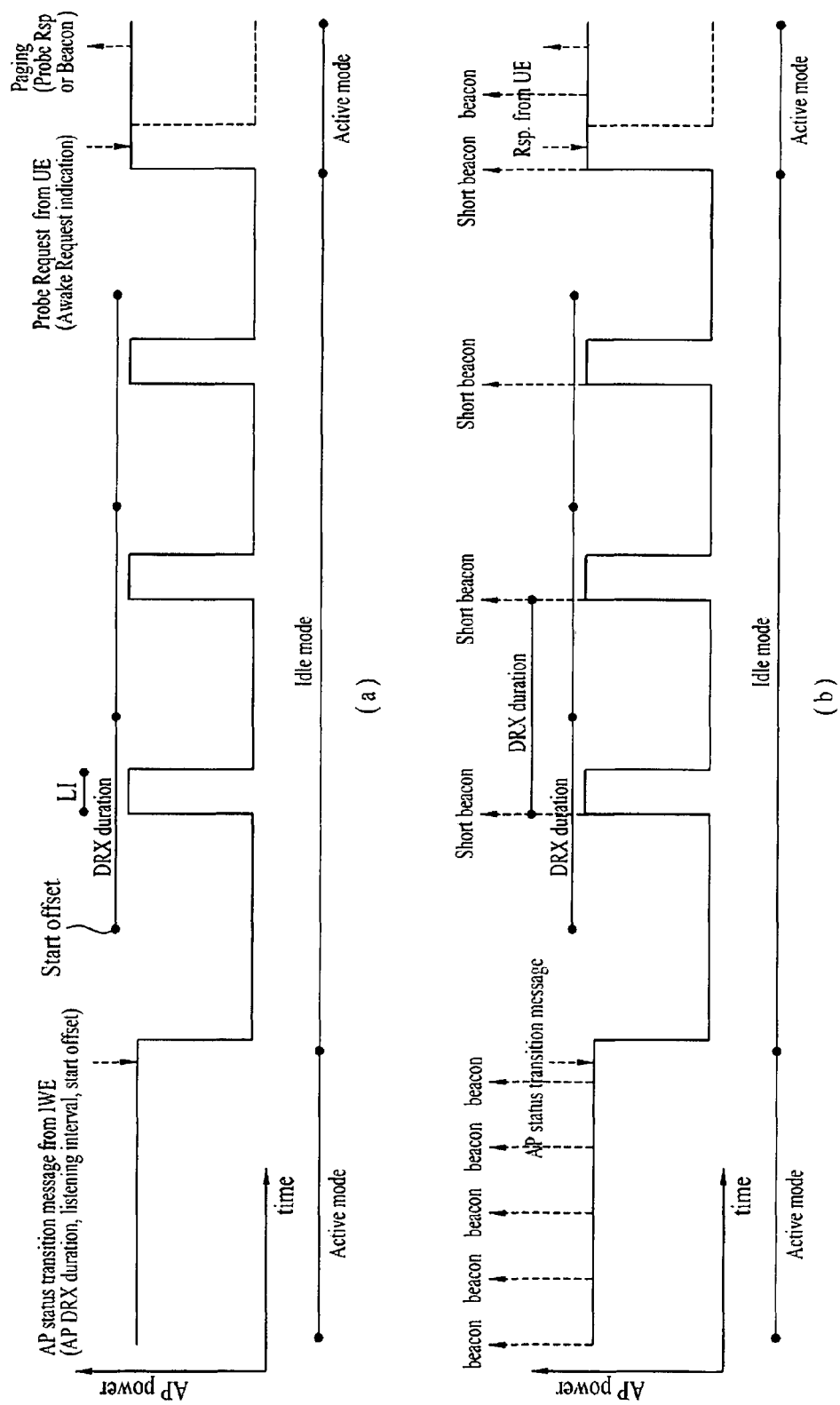
FIG. 4 illustrates an idle mode of an access point (AP) of a second RAT, according to an embodiment of the present invention.

Method D). Use Control Interface Between IWME and AP
An AP (i.e., secondary system) is controlled using control connection between an IWME and the AR FIG. 4 illustrates an idle mode of a BS of a second RAT, according to an embodiment of the present invention. The BS of the second RAT may transit its status from an active mode to an idle mode according to self determination or according to an instruction of an IWE. According to an embodiment, the idle mode may be referred to as a discontinuous reception (DRX) mode, a discontinuous transmission mode (DTX) mode, or a DRX/DTX mode. It is assumed that the BS of the second RAT is an AP of a WLAN.

When a trigger condition is satisfied, the status of the AP may be switched from the active mode to the idle mode. As the trigger condition, for example, 1) if a neighboring AP causes severe interference (e.g., in case of a public AP), 2) if a specific AP has not user (e.g., in case of a private AP), or 3) in a time zone when there are few or no users (e.g., in case of a public AP), the IWE may indicate a specific AP to be turned off.

The idle mode/active mode of the AP may be set with respect to all channels of the AP, or set for each channel. For example, the idle mode may be set for a channel lastly used by the AP, or the AP may monitor only a channel selected by the IWE.

Referring to FIG. 4(a), the AP receives a message for defining operation of the AP in the idle mode, from the IWE. The message for defining operation of the AP includes information required when the AP operates in the idle mode. For example, the message for defining operation of the AP may include at least one of information about a DRX duration, a DRX start offset, a listening interval, and a sleep interval.

In the idle mode, the AP awakes at least once in the DRX duration to monitor a channel. DRX may refer to discontinuous channel monitoring in the embodiment of FIG. 4(a). If the message for defining operation of the AP includes a start offset, the DRX duration starts from the start offset. The listening interval (LI) is a period in which the AP awakes temporarily in the DRX duration of the AP to monitor a channel. For example, the AP determines whether there is a paging message transmitted from a UE, during the listening interval. The AP only monitors data transmitted from the UE and does not transmit any message during the listening interval. The sleep interval is a period of the DRX duration of the AP other than the listening interval, and the AP turns its power off and does not monitor any channel during the sleep interval.

The AP may receive an awake request message from the UE during the listening interval. In other words, the AP may receive a message for requesting the AP to transit its status to the active mode, from the UE. The awake request message may be implemented as various types such as probe request type, paging type, and awake request indication type. When the awake request message is received from the UE during the listening interval, the AP is transited to the active mode and transmits a response to the UE. The response transmitted from the AP to the UE may include, for example, a probe response or beacon, but is not limited thereto.

As described above, since the AP discontinuously monitors a channel in the idle mode, the UE should know the location of the listening interval to awake the AP.

In FIG. 4(b), descriptions repeated from FIG. 4(a) are omitted. Referring to FIG. 4(b), the AP transmits a normal beacon signal in the active mode but transmits a short beacon signal in the idle mode.

Compared to a normal beacon, a short beacon may have a short transmission signal or message length, and a long transmission cycle. The short beacon may include at least one of identification information for identifying the AP, information about the status of the AP, and information about the DRX duration, the start offset, the listening interval, and the sleep interval. The short beacon may also include information for the UE to calculate the listening interval of the AP. For example, when the listening interval (frames) is calculated using ID % N of the AP, N may be provided to the UE through the short beacon of the AP or by the IWE.

Since the short beacon is discontinuously transmittable, the idle mode of FIG. 4(b) includes DTX operation. The short beacon may be transmitted prior to the listening interval. For example, the short beacon may be transmitted in a start frame of the listening interval, in a frame immediately before the start frame of the listening interval, or in a frame located n frames (n>1) before the start frame of the listening interval, but is not limited thereto.

The short beacon is transmitted at least once in the DTX duration, and the DTX duration may have the same length as that of the DRX duration.

In another embodiment, the short beacon is transmittable even in the active mode. A transmission cycle of the short beacon in the active mode may be shorter than that in the idle mode.

The AP monitors a channel during the listening interval after the short beacon is transmitted, and is transited to the active mode if a response to the short beacon is received from the UE.

Figure 5:
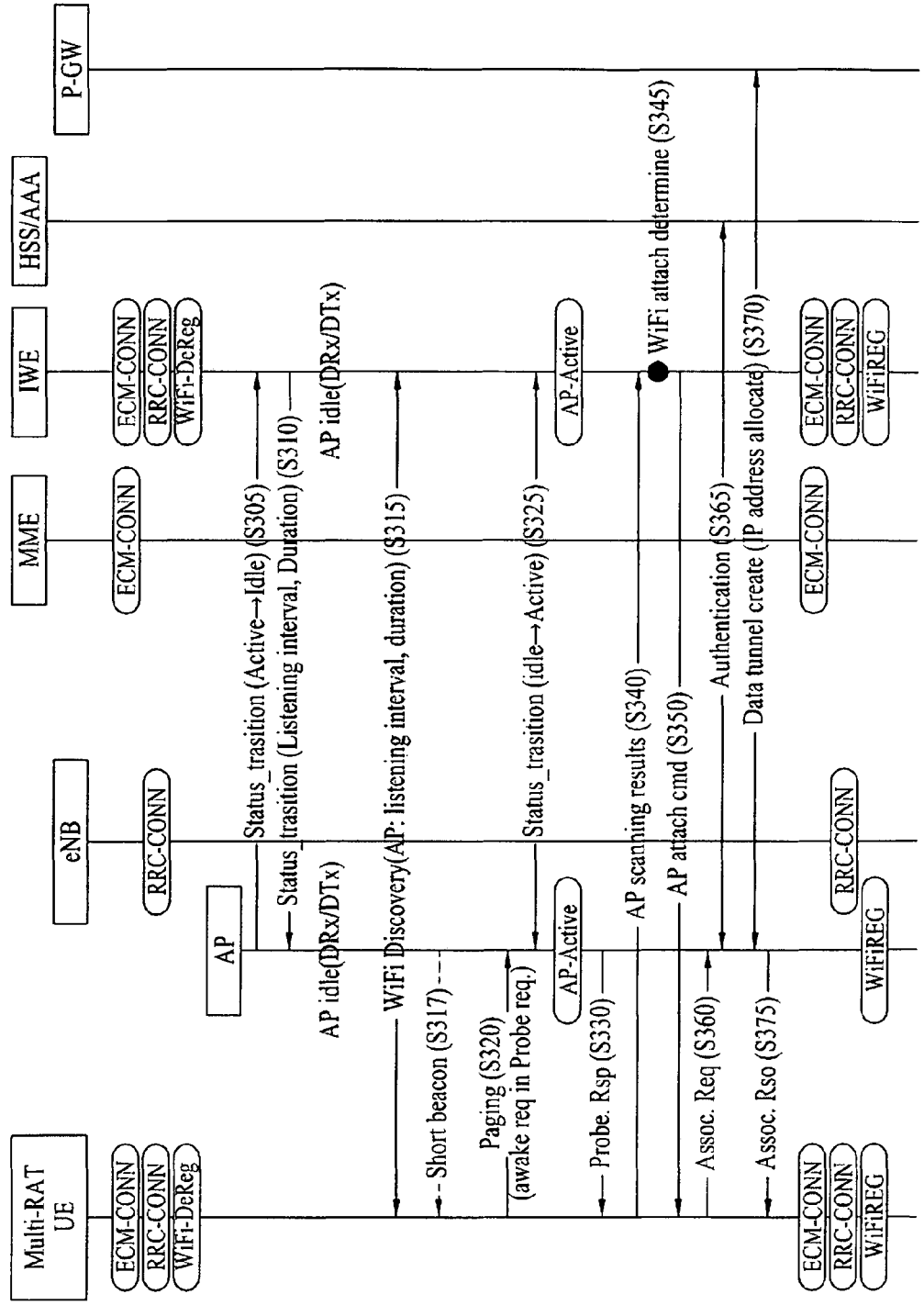
FIG. 5 illustrates a method for transiting the status of an AP of a second RAT, according to an embodiment of the present invention.

FIG. 5 illustrates a method for transiting the status of an AP of a second RAT, according to an embodiment of the present invention. Referring to FIG. 5, for convenience of explanation, an IWE is an entity other than an eNB and a MME. However, as described above, the IWE may be an arbitrary node of a first RAT, e.g., eNB or MME. It is assumed that a UE supports multiple RATs and is connected to the first RAT only. The second RAT has one AP for convenience of explanation, but a plurality of APs may exist.

To transit its status from an active mode to an idle mode, the AP of the second RAT transmits a message indicating that a trigger condition for status transition is satisfied, to the IWE (S305). The AP of the second RAT may transit its status to the idle mode according to self determination, and report it to the IWE. However, according to another embodiment in which the IWE determines the trigger condition, S305 may be omitted.

The IWE transmits a message for defining operation of the AP in the idle mode, to the AP of the second RAT (S310). According to another embodiment in which the IWE instructs status transition to the AP, a command for instructing the AP to transit its status to the idle mode may be transmitted to the AR The command for instructing the AP to transit its status to the idle mode may be transmitted together with or separately from the message for defining operation of the AP.

The message for defining operation of the AP may include information required for operation of the AP in the idle mode, for example, at least one of information about a DRX duration, a listening interval, and a start offset. According to an embodiment in which the AP of the second RAT discontinuously transmits a short beacon in the idle mode, the message for defining operation of the AP may further include information about a DTX duration of the short beacon. The message for defining operation of the AP may be transmitted to the AP through wired/wireless control connection between the AP of the second RAT and the IWE.

The AP of the second RAT operates based on information for defining operation of the AP, which is received from the IWE. A description of the operation of the AP in the idle mode is given above in relation to FIG. 4. The IWE stores information about the status of the AP of the second RAT, for example, information about the active mode/idle mode, the DRX duration, the listening interval, and the start offset.

In a case when the UE needs to access the AP of the second RAT, the IWE transmits information about the AP of the second RAT to the UE (S315). The IWE may transmit information about at least one AP of the second RAT, which is adjacent to the UE, based on the location of the UE. For example, upon determining that the UE is located in area A, the IWE may transmit information about an AP of the second RAT, which is located in area A or within a predetermined distance from area A, to the UE. The predetermined distance may be determined in consideration of the coverage of the AP of the second RAT. If a plurality of APs exists near the UE, the IWE may transmit information about the plurality of APs to the UE.

The case when the UE needs to access the AP of the second RAT may include a case when the UE moves to enter a specific cell of the first RAT adjacent to the AP of the second RAT, a case when UL/DL data traffic of the UE for the first RAT is increased, and a case when the UE requests the first RAT to access the second RAT, but is not limited thereto.

In addition, the IWE may transmit information about an AP preferred by the UE (hereinafter referred to as a preferred AP), for example, an AP recently accessed by the UE or an AP frequently accessed by the UE, to the UE. If a plurality of APs exists near the UE, the information about the preferred AP may be transmitted first to the UE. Unlike this, the information about the plurality of APs is transmitted to the UE by giving priorities to the APs. Meanwhile, to identify the preferred AP, the IWE may acquire information about access to the second RAT from the UE, or acquire information about access of the UE from the AP of the second RAT.

The information about the AP of the second RAT, which is transmitted from the IWE to the UE, includes information about the status of the AP. For example, a parameter indicating whether the status of the AP is the active mode or the idle mode may be transmitted in 1 bit. However, the status of the AP may further include other modes in addition to the active mode and the idle mode. In this case, the size of the information about the status of the AP is variable depending on the number of modes.

The UE may determine the status of at least one AP of the second RAT, which is adjacent to the UE, using the information about the AP of the second RAT, which is received from the IWE. If the AP of the second RAT in the idle mode, the information about the AP of the second RAT may further include information about the DRX duration, the listening interval, and the start offset. In addition, the information about the AP of the second RAT may further include basic information of AP (e.g., SSID, channel list, center frequency, etc.).

The UE scans for APs near the UE based on the information about the AP of the second RAT, which is received from the IWE. The UE may determine whether there is an AP in the idle mode among the APs adjacent to the UE, based on the information about the AP of the second RAT. If there is an AP in the idle mode, the UE may determine whether the UE is located within the coverage of the AP in the idle mode, using the information about the AP of the second RAT.

The UE may check the location of a listening interval of the AP in the idle mode, using the information about the AP of the second RAT. For example, the UE may calculate the location of the listening interval of the AP of the second RAT, using the DRX duration, the start offset, and the listening interval.

The UE creates an awake request message for requesting the AP of the second RAT in the idle mode to awake, and transmits the awake request message in the listening interval (S320). The awake request message may be implemented by adding a new parameter (e.g., awake indication) to a probe request type message. Alternatively, the awake request message may be implemented as a new type (e.g., paging AP) which is not conventionally defined. In addition, the awake request message may further include information about the UE (e.g., UE ID, supported rates, supported operating classes, etc.).

The AP receives the awake request message from the UE in the listening interval, transits its status to the active mode, and reports to the IWE that the status is transited (S325). The IWE updates the information about the status of the AP. In addition, the AP transmits a response message to the awake request message, to the UE (S330). The response message of the AP may be, for example, a probe response message, a beacon message, or a new type paging ACK message. The UE may determine that the UE is located in the coverage of the AP of the second RAT, using the response message from the AP. In other words, it may be understood that the AP which has transmitted the response message is scanned by the UE and the status of the AP is transited to the active mode upon a request of the UE.

According to an embodiment of the present invention, the AP may be a private AP, and the AP may first determine whether the UE is authorized to access the AP, using the information about the UE included in the awake request message. Upon determining that the UE is not authorized to access the AP, the AP may maintain the idle mode.

If the response message to the awake request message is not received from the AP, the UE determines that the AP is not scanned. In other words, the UE may determine that the UE is not located in the coverage of the AP. In this case, the AP does not transit its status to the active mode and constantly maintains the idle mode. Meanwhile, the UE may attempt to access another AP.

The UE transmits an AP scanning result to the IWE (S340). If a plurality of APs is scanned, the UE may notify it to the IWE. According to an embodiment, additional information about the scanned APs, e.g., SNR, interference, etc., may also be transmitted.

The IWE determines an AP of the second RAT to be accessed by the UE (S345). If a plurality of APs is scanned, the IWE determines one of the scanned APs as the AP to be accessed by the UE. The IWE may determine the preferred AP as the AP to be accessed by the UE. The IWE may select an AP having small interference and excellent channel quality among the scanned APs. The IWE transmits a command to access the determined AP (e.g., AP attach cmd), to the UE (S350).

The UE transmits a connection request (e.g., association request) to the AP of the second RAT (S360), and the AP performs authentication through Home Subscriber Server/Authentication, Authorization and Accounting (HSS/AAA) (S365). If authentication is succeeded, a data tunnel is created between the AP and a P-GW and the P-GW allocates an IP address to the AP (S370). The AP transmits an association response to the UE (S375), thereby completing a connection procedure between the UE and AP.

After the UE is connected to the AP of the second RAT, the UE may release connection to the first RAT (handover or switching), or may simultaneously maintain connection to the first RAT and connection to the second RAT. Accordingly, the UE may simultaneously transmit and receive UL/DL data to and from the first RAT and the second RAT.

According to another embodiment, the IWE may transit the status of the AP to the active mode. However, in this case, the IWE may not accurately determine whether the UE is located in the coverage of the AP. If the status of the AP is transited to the active mode when the UE is not located in the coverage of the AP, an AP inaccessible by the UE may be unnecessarily transited. The reason why the IWE may not accurately determine whether the UE is located in the coverage of the AP is because the coverage of the AP of the second RAT is narrower than the coverage of one cell managed by an eNB of the first RAT. According to an embodiment of the present invention, the status of the AP is transited based on the AP scanning result of the UE, and thus the above-mentioned problem may be solved.

According to another embodiment, the AP of the second RAT may transmit a short beacon in the idle mode (S317). However, according to an embodiment in which the AP does not transmit a short beacon in the idle mode, S317 may be omitted. The short beacon may include identification information for identifying the AP (e.g., BSSID) and information about the status of the AP. The short beacon may include information about a transmission cycle or a DTX duration of the short beacon. Unlike this, the UE may receive the information about the transmission cycle or the DTX duration of the short beacon from the IWE.

A method for receiving the awake request message (e.g., paging) transmitted from the UE, by the AP which transmits the short beacon includes (i) to (iii) below, but is not limited thereto.

(i). The AP monitors for a paging message from the UE during a predetermined period (e.g., listening interval) from a point of time when the short beacon is transmitted. Information about the listening interval may be transmitted from the IWE or using the short beacon.

(ii). The short beacon includes information required to calculate the listening interval, and the UE calculates the listening interval using the short beacon. For example, the listening interval (frames) is calculated using ID % N of the AP. Here, N may be provided by the AP or through the IWE.

(iii). The UE receives information about the AP, e.g., DRX duration, DTX duration, start offset, listening interval, etc., from the IWE. The UE receives the short beacon of the AP and transmits a paging message to the AP based on the information received from the IWE.

Figure 6:
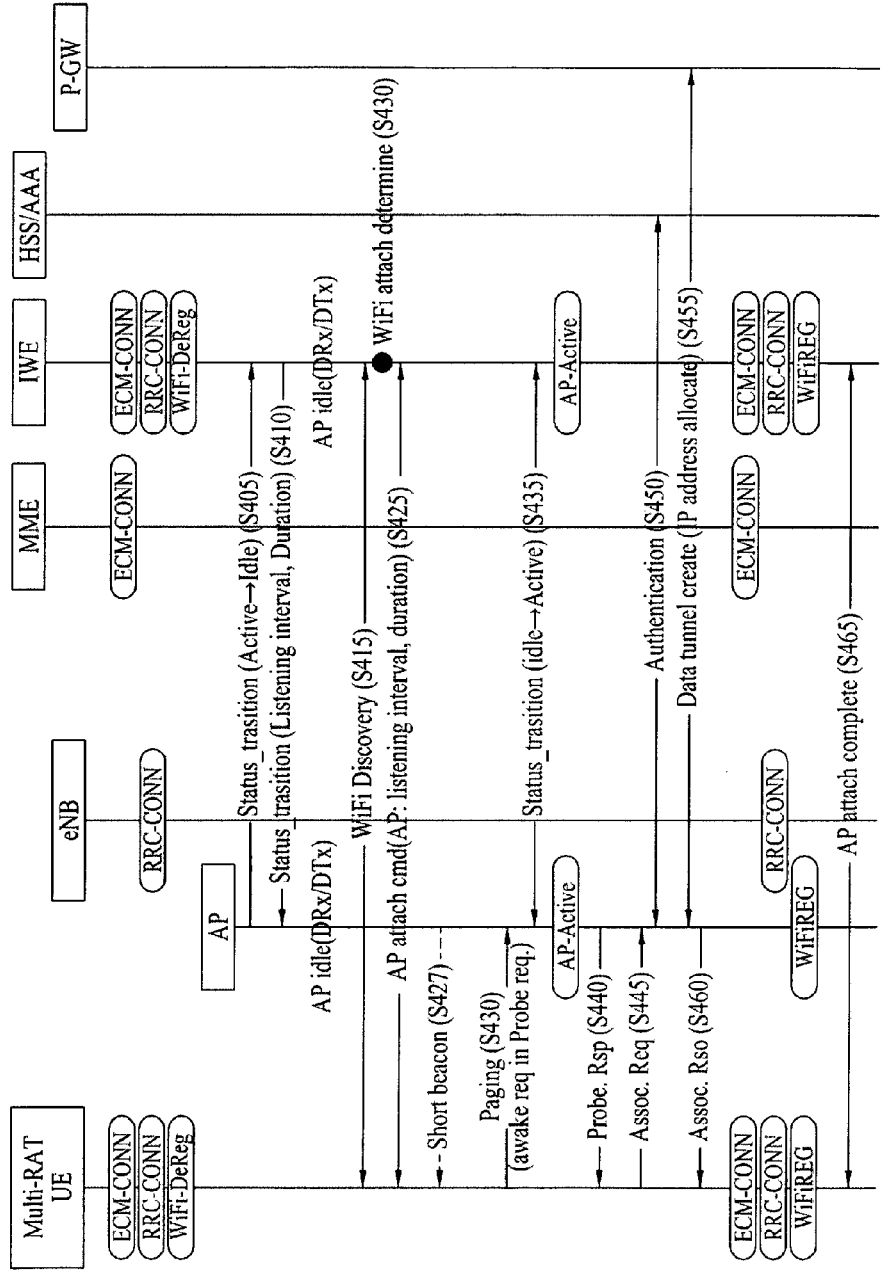
FIG. 6 illustrates a method for transiting the status of the AP of the second RAT, according to another embodiment of the present invention.

FIG. 6 illustrates a method for transiting the status of the AP of the second RAT, according to another embodiment of the present invention. Hereinafter, descriptions repeated from FIG. 5 may be omitted.

The AP of the second RAT transmits a message indicating that a trigger condition for status transition to the idle mode is satisfied, to the IWE (S405). The IWE transmits a message for defining operation of the AP in the idle mode, to the AP of the second RAT (S410).

The UE scans for neighboring APs and transmits a result thereof to the IWE (S415). According to an embodiment of the present invention, it is assumed that the UE may scan only an AP in the active mode and may not scan an AP in the idle mode among APs adjacent to the UE.

The IWE determines an AP to be accessed by the UE (S420). The IWE may determine the AP to be accessed by the UE, based on only the AP scanning result received from the UE, or determine an AP in the idle mode, which is not scanned by the UE, as the AP to be accessed by the UE. For example, if the status of a preferred AP is the idle mode, although the preferred AP is not scanned by the UE, the IWE may determine the preferred AP as the AP to be accessed by the UE.

The IWE transmits an AP access command (e.g., AP attach cmd) to the UE (S425). The AP access command may include the information about the AP of the second RAT to be accessed by the UE. The information about the AP of the second RAT may include identification information of the AP and information about the status of the AP. If the status of the AP to be accessed by the UE is the idle mode, the information about the AP may further include information about a DRX duration, a listening interval, and a start offset. Hereinafter, it is assumed that the status of the AP to be accessed by the UE is the idle mode.

The UE creates an awake request message for requesting the AP of the second RAT in the idle mode to awake, and transmits the awake request message in the listening interval of the AP of the second RAT (S430). The AP of the second RAT in the idle mode transits its status to the active mode, and reports to the IWE that the status is transited (S435). In addition, the AP transmits a response message to the awake request message, to the UE (S440).

If the response message is received from the AP, the UE transmits a connection request (e.g., association request) to the AP of the second RAT which is transited to the active mode (S445), and the AP performs authentication through HSS/AAA (S450). If authentication is succeeded, a data tunnel is created between the AP and a P-GW and the P-GW allocates an IP address to the AP (S455). The AP transmits an association response to the UE (S460), thereby completing a connection procedure between the UE and AP. The UE transmits a message indicating that connection to the AP is completed, to the IWE (S465).

According to another embodiment, the AP of the second RAT may transmit a short beacon in the idle mode (S427), and a detailed description thereof is given above in relation to FIG. 5.

Figure 7:
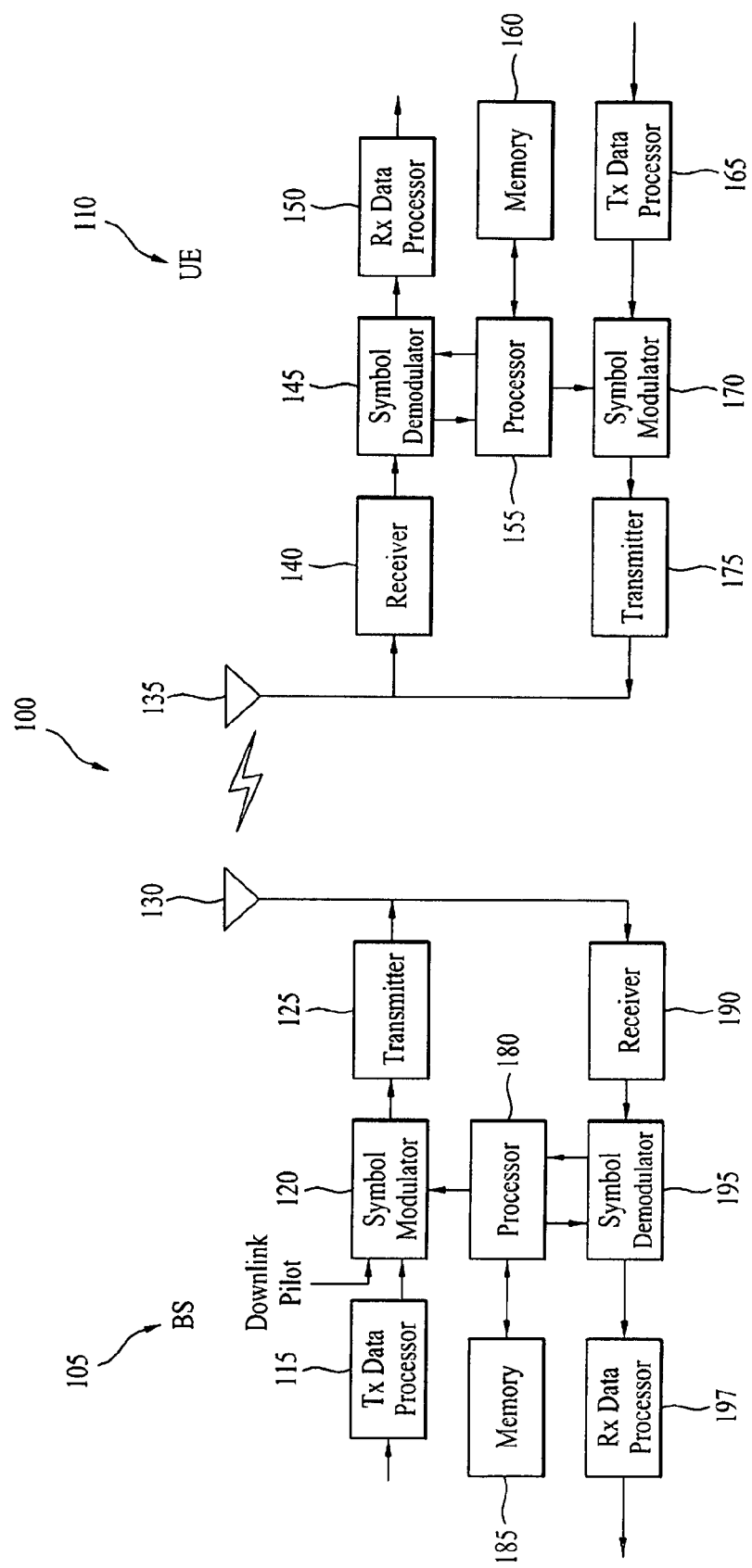
FIG. 7 illustrates a UE and a base station (BS), according to an embodiment of the present invention.

FIG. 7 illustrates a UE 110 and a BS 105, according to an embodiment of the present invention. The BS 105 of FIG. 7 may be an IWE of a first RAT or a BS (e.g., AP) of a second RAT. A RAT 100 may be the above-described first RAT or the second RAT. Although one BS 105 and one UE 110 (including a device-to-device (D2D) device) are illustrated in FIG. 7, the RAT 100 may include two or more BSs and/or two or more UEs.

Referring to FIG. 7, the BS 105 may include a transmission (Tx) data processor 115, a symbol modulator 120, a transmitter 125, a transmission/reception (Tx/Rx) antenna 130, a processor 180, a memory 185, a receiver 190, a symbol demodulator 195, and a reception (Rx) data processor 197. The UE 110 may include a Tx data processor 165, a symbol modulator 175, a transmitter 175, a Tx/Rx antenna 135, a processor 155, a memory 160, a receiver 140, a symbol demodulator 155, and a Rx data processor 150. Although one Tx/Rx antenna 130 or 135 is included in the BS 105 or the UE 110 in FIG. 7, each of the BS 105 and the UE 110 actually includes a plurality of Tx/Rx antennas. Thus, according to the present invention, the BS 105 and the UE 110 support Multiple Input Multiple Output (MIMO). The BS 105 may also support both Single User MIMO (SU-MIMO) and Multi-User MIMO (MU-MIMO).

On downlink, the Tx data processor 115 receives traffic data, formats the received traffic data, encodes the formatted traffic data, and interleaves and modulates (or symbol-maps) the encoded traffic data to provide modulated symbols ("data symbols"). The symbol modulator 120 receives and processes the data symbols and pilot symbols to provide a symbol stream.

The symbol modulator 120 multiplexes the data symbols and pilot symbols and transmits the multiplexed data and pilot symbols to the transmitter 125. In this case, each transmitted symbol may be a data symbol, a pilot symbol, or a null signal value. In each symbol period, pilot symbols may be consecutively transmitted. The pilot symbols may be Frequency Division Multiplexing (FDM), Orthogonal Frequency Division Multiplexing (OFDM), Time Division Multiplexing (TDM), or Code Division Multiplexing (CDM) symbols.

The transmitter 125 receives a stream of the symbols, converts the received stream to one or more analog signals, and additionally adjusts (e.g. amplifies, filters, and frequency-upconverts) the analog signals to generate a downlink signal suitable for transmission on a radio channel. Then, the Tx antenna 130 transmits the generated downlink signal to the UE 110.

In the configuration of the UE 110, the Rx antenna 135 receives the downlink signal from the BS 105 and provides the received downlink signal to the receiver 140. The receiver 140 adjusts (e.g. filters, amplifies, and frequency-downconverts) the received signal and digitizes the adjusted signal to acquire samples. The symbol demodulator 145 demodulates the received pilot symbols and provides the demodulated pilot symbols to the processor 155 for channel estimation.

In addition, the symbol demodulator 145 receives a frequency response estimate for downlink from the processor 155, demodulates the received data symbols to acquire data symbol estimates (estimates of the transmitted data symbols), and provides the data symbol estimates to the Rx data processor 150. The Rx data processor 150 demodulates (i.e., symbol-demaps), deinterleaves, and decodes the data symbol estimates to restore the transmitted traffic data.

Processes performed by the symbol demodulator 145 and the Rx data processor 150 are complementary to those performed by the symbol modulator 120 and the Tx data processor 115 of the BS 105.

On uplink, the Tx data processor 165 of the UE 110 processes traffic data to provide data symbols. The symbol modulator 170 may receive, multiplex, and modulate the data symbols and provide a stream of the symbols to the transmitter 175. The transmitter 175 receives and processes the received stream to generate an uplink signal. The transmit antenna 135 transmits the generated uplink signal to the BS 105.

In the BS 105, the uplink signal is received through the Rx antenna 130 from the UE 110 and the receiver 190 processes the received uplink signal to acquire samples. After that, the symbol demodulator 195 processes the samples to provide pilot symbols and data symbol estimates which are received on uplink. The Rx data processor 197 processes the data symbol estimates to restore the traffic data transmitted from the UE 110.

The processor 155 or 180 of the UE 110 or the BS 105 instructs (e.g. controls, adjusts, manages, etc.) operation of the UE 110 and the BS 105. The processor 155 or 180 may be connected to the memory 160 or 185 which stores program codes and data. The memory 160 or 185 may be connected to the processor 155 or 180 and store operating systems, applications, and general files.

The processor 155 or 180 may be called controller, microcontroller, microprocessor, microcomputer, etc. The processor 155 or 180 may be implemented in hardware, firmware, software, or a combination thereof. In a hardware configuration, the processor 155 or 180 may be provided with Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. which are configured to implement the present invention.

In a firmware or software configuration, embodiments of the present invention may be implemented in the form of a module, a procedure, a function, etc. Firmware or software configured to implement the present invention may reside in the processor 155 or 180, or may be stored in the memory 160 or 185 and executed by the processor 155 or 180.

The layers of radio interface protocols between the UE 110 and the BS 105 may be classified into Layers 1, 2 and 3 (L1, L2 and L3) based on the three lowest layers of the Open System Interconnection (OSI) model. A physical layer corresponds to L1 and provides information transmission service on physical channels. A Radio Resource Control (RRC) layer corresponds to L3 and provides radio control resources between the UE 110 and a network. The UE 110 and the BS 105 may exchange RRC messages with a wireless communication network through the RRC layer.

In this specification, the processor 155 of the UE 110 and the processor 180 of the BS 105 perform signal and data processing operations other than signal transmission/reception and storing functions of the UE 110 and the BS 105. However, the processor 155 or 180 is not particularly mentioned below for convenience of explanation. Even in that case, it would be understood that a series of signal and data processing operations other than signal transmission/reception and storing functions is performed by the processor 155 or 180.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for scanning for a base station (BS) of a second radio access technology (RAT) by a user equipment (UE) connected to a first RAT in a multi-RAT environment, the method comprising:
    receiving information about one or more BSs of the second RAT adjacent to the UE, from an interworking entity (IWE) of the first RAT which manages interworking between the first RAT and the second RAT;
    receiving, from a specific BS among the one or more BSs of the second RAT, a beacon signal comprising information about a status of the specific BS;
    determining whether the status of the specific BS is an idle mode based on the beacon signal;
    transmitting an awake request message to the specific BS in a listening interval of the specific BS to which the UE desires to access, if the status of the specific BS is the idle mode;
    transmitting, to the IWE of the first RAT, a result of scanning for the one or more BSs of the second RAT based on a response of the specific BS to the awake request message; and
    receiving, from the IWE of the first RAT, a command to access one of the one or more BSs of the second RAT scanned by the UE,
    wherein listening interval information, a discontinuous reception (DRX) duration and a start offset of the DRX duration are included in the received information about one or more BSs of the second RAT based on a location of the UE, and
    wherein the UE determines a transmission timing of the awake request message based on the listening interval information, the DRX duration and the start offset.

2. The method according to claim 1, wherein the information about one or more BSs of the second RAT further comprises status information of the BSs of the second RAT.

3. The method according to claim 2, wherein the DRX duration and the start offset are included in the received information about the one or more BSs of the second RAT only when the status information of the BSs of the second RAT indicates the idle mode.

4. The method according to claim 1, further comprising determining whether the status of the specific BS is the idle mode or an active mode, based on the information about one or more BSs of the second RAT.

5. The method according to claim 1, wherein the first RAT is a cellular network, the second RAT is a wireless local area network (WLAN), the IWE of the first RAT is an evolved Node B (eNode B or eNB) or a mobility management entity (MME) of the cellular network, and the BSs of the second RAT are access points (APs) of the WLAN.

6. The method according to claim 1, wherein the first RAT and the second RAT are heterogeneous networks, the IWE of the first RAT and the BSs of the second RAT are connected using a backhaul interface or an air interface, and the BSs of the second RAT operate as UEs with respect to the IWE of the first RAT.

7. The method according to claim 1, further comprising accessing the specific BS which awakes from the idle mode, according to whether a response to the awake request message is received from the specific BS.

8. The method according to claim 7, wherein when the response to the awake request message is not received from the specific BS, the UE considers the UE is out of coverage of the specific BS.

9. The method according to claim 1, wherein the awake request message is a paging message type or a probe request message type, and comprises at least one of an identifier of the specific BS, a parameter for status transition, and information about the UE.

10. A user equipment (UE) connected to a first radio access technology (RAT) in a multi-RAT environment, the UE comprising:
a receiver;
a transmitter; and
a processor configured to:
receive, through the receiver, information about one or more base stations (BSs) of a second RAT adjacent to the UE, from an interworking entity (IWE) of the first RAT which manages interworking between the first RAT and the second RAT,
receive, through the receiver from a specific BS among the one or more BSs of the second RAT, a beacon signal comprising information about a status of the specific BS,
determine whether the status of the specific BS is an idle mode based on the beacon signal,
transmit, through the transmitter, an awake request message to the specific BS in a listening interval of the specific BS, if the status of the specific BS to which the UE desires to access is the idle mode,
transmit, through the transmitter to the IWE of the first RAT, a result of scanning for the one or more BSs of the second RAT based on a response of the specific BS to the awake request message, and
receive, through the receiver from the IWE of the first RAT, a command to access one of the one or more BSs of the second RAT scanned by the UE,
wherein listening interval information, a discontinuous reception (DRX) duration and a start offset of the DRX duration are included in the information about the one or more BSs of the second RAT based on a location of the UE, and
wherein the processor determines a transmission timing of the awake request message based on the listening interval information, the DRX duration and the start offset.

* * * * *